(12) United States Patent
Ito et al.

(10) Patent No.: US 6,407,701 B2
(45) Date of Patent: Jun. 18, 2002

(54) GPS RECEIVER CAPABLE OF CALCULATING ACCURATE 2DRMS

(75) Inventors: Mutsumi Ito; Kenichi Shoji, both of Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/816,297

(22) Filed: Mar. 23, 2001

(30) Foreign Application Priority Data

Mar. 24, 2000 (JP) .................................. 2000-084028

(51) Int. Cl.$^7$ .............................. H04B 7/185; G01S 5/02
(52) U.S. Cl. ............................ 342/357.12; 342/357.14; 701/216
(58) Field of Search .................. 342/357.02, 357.06, 342/357.12, 357.14; 701/213, 215, 216, 217

(56) References Cited

U.S. PATENT DOCUMENTS

| | | | | |
|---|---|---|---|---|
| 5,367,463 A | * | 11/1994 | Tsuji ........................ 364/449 |
| 5,416,712 A | * | 5/1995 | Geier et al. .................. 364/450 |
| 5,590,043 A | * | 12/1996 | McBurney ............... 364/449.1 |
| 5,760,737 A | * | 6/1998 | Brenner ...................... 342/357 |
| 5,825,326 A | * | 10/1998 | Semler et al. .............. 342/357 |

* cited by examiner

*Primary Examiner*—Dao Phan
(74) *Attorney, Agent, or Firm*—Pitney, Hardin, Kipp & Szuch LLP

(57) ABSTRACT

In the GPS receiver, GPS solutions are calculated by performing GPS measurement using a Kalman filter. The GPS receiver is provided with a computing system which calculates 2DRMS according to an equation:

$$2DRMS = 2 \times \sqrt{(\sigma_{H\_Kalman})^2 + (HDOP \times \sigma_{UERE})^2}$$

wherein, $\sigma H\_Kalman$ represents a horizontal component of an estimate error obtained from a diagonal in an error covariance matrix calculated in a mathematical process of the Kalman filter, HDOP represents a horizontal dilution of precision, and $\sigma_{UERE}$ is a user equivalent range error.

10 Claims, 9 Drawing Sheets

GPS RECEIVER CAPABLE OF CALCULATING ACCURATE 2DRMS

BACKGROUND OF THE INVENTION

The present invention relates to a GPS (Global Positioning System) receiver which provides evaluation values for evaluating accuracy of data obtained by GPS measurement, and the invention also relates to a navigation system in which such a GPS receiver is implemented.

In general, a GPS receiver provides data indicative of a position (a GPS position) and a velocity (a GPS velocity), in real time, by performing the GPS measurement. The data (the GPS position and/or the GPS velocity) obtained by performing the GPS measurement is also referred to as a GPS solution. In the GPS measurement, the GPS position is calculated using a range, or a distance between the GPS receiver and GPS satellite, which is measured using a satellite signal.

It is well known that the range measured using the satellite signal includes an error due to, for example, Satellite clock stability, Ephemeris prediction error, Ionospheric delay, Tropospheric delay and other error sources. Therefore, the range measured using satellite signal is called a pseudo-range.

Further, the GPS receiver calculates an evaluation value for evaluating accuracy of the GPS position in real time. In general, 2DRMS (2×Distance Root Mean Square), i.e., $2\sigma$ value (2×standard deviation) of the horizontal error in the GPS position, is used as the evaluation value. Typically, the 2DRMS is a radius of a circle which contains 95% of all possible GPS positions.

Conventionally, 2DRMS is defined by the equation (1):

$$2DRMS = 2 \cdot HDOP \cdot \sigma_{UERE} \quad (1)$$

where HDOP is a horizontal dilution of precision, and $\sigma_{UERE}$ (user equivalent range error) is a root-sum-square value of each $1\sigma$ error included in the measured pseudo-range described above. Typically, the $\sigma_{UERE}$ is a constant, for example, 8.0 m.

The DOP (Dilution Of Precision) is a factor to relate an error in pseudo-range with an error in GPS position. The DOP changes according to the satellite geometry.

In general, a Kalman filter, which is well-known in the art, is employed in the GPS receiver or the navigation system. A publication, "Understanding GPS: principles and applications", E D. Kaplan ed., Artech House, 1996, describes the use of the Kalman filter in the GPS receiver and calculation of the HDOP and the conventional 2DRMS, teachings of which are incorporated herein by reference.

Treating the GPS solution as a dynamic system, the Kalman filter calculates an estimate of the GPS solution and an error covariance matrix of the estimate. In the mathematical process of the Kalman filter, the estimate and the error covariance matrix of the estimate obtained in the prior estimation are referred to in the succeeding estimation.

The mathematical processes of the Kalman filter includes; provisionally estimating a system state based on a state equation to obtain a provisional estimate; and updating the estimated system state (the estimate) using a difference between a measurement value (a GPS solution) and the provisional estimate.

The updating process for a simple model is given by the equation (2):

$$X(t) = x(t) + K(t)[Y(t) - x(t)] \quad (2)$$

where X(t) is the estimate, x(t) is the provisional estimate, Y(t) is the measurement value, and K(t) is a Kalman gain.

The following is an example of a computing process in the GPS receiver. The GPS receiver first performs the GPS measurement using the Kalman filter. Next, the HDOP is calculated based on geometry of GPS satellites used in the GPS measurement, and the 2DRMS is calculated according to the equation (1). Then, the GPS solution and the 2DRMS are outputted from the GPS receiver as a part of a GPS message. This GPS message is received and used by the navigation system which functions as a host to the GPS receiver.

In the navigation system, a CPU (Central Processing Unit), which executes a navigation application program, performs estimating a location of a vehicle by using both the GPS solution and a result of a dead-reckoning (a DR solution) computed based on signals outputted by dead-reckoning sensors. The signals from the dead-reckoning sensors include, for example, a gyro output signal, a speed pulse signal and a back signal.

The following is an example of a process of the navigation application program. Initially, the GPS solution and 2DRMS are transferred from the GPS receiver to the CPU in the navigation system. Then, the signals outputted by the dead-reckoning sensors are received and the DR solution is calculated by the CPU. Also, an evaluation value which indicates an error included in the DR solution is calculated.

By making a comparison of the evaluation value of the DR solution and the 2DRMS, the CPU select the GPS solution or the DR solution as a location of the vehicle. Finally, the location selected according to the process described above is compensated using a map-matching.

Thus, the 2DRMS plays an important role in avoiding an undesirable effect from the error included in the DR solution and/or the GPS solution, and in obtaining the location of the vehicle with high accuracy.

However, there may be a case where, the 2DRMS, based on the conventional definition, expressed in the equation (1), takes discrete data values, because the HDOP used for calculating the 2DRMS varies depending on an instantaneous GPS satellites geometry. In particular, in the case of receiving the GPS signal at a mobile station (i.e., a vehicle), since geometry of available satellites, from which GPS signals are receivable, varies from moment to moment, a correlation of the 2DRMS, calculated based on the conventional definition, with respect to time becomes weak.

Figure 1:
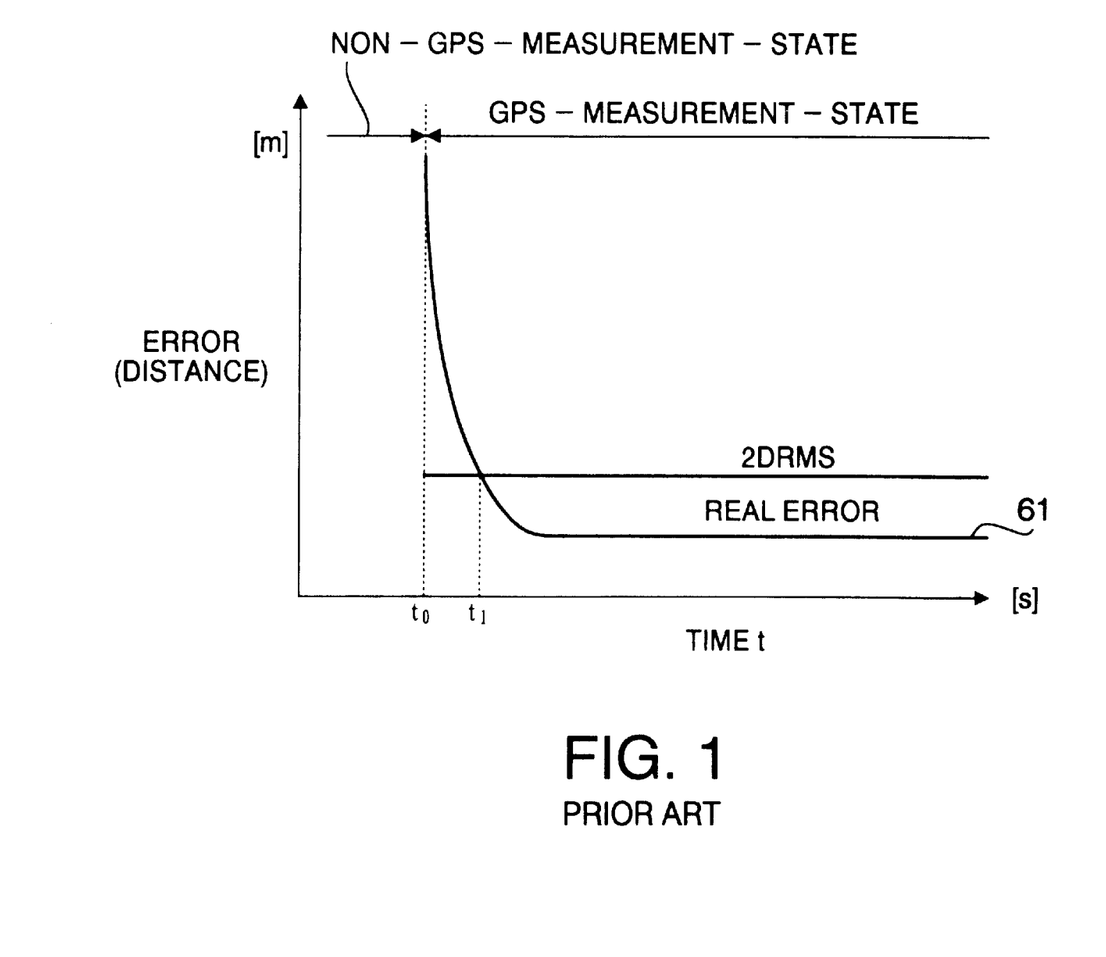
FIG. 1 is a graph showing a relation between 2DRMS based on a conventional definition and a real error included in GPS solutions.

A complication arises from such nature of the 2DRMS, as follows. FIG. 1 is a graph showing a relation between the 2DRMS based on the conventional definition and a real error 61 included in the GPS solution.

In FIG. 1, relatively long time period of up to t0 represents a state in which the GPS receiver can not receive GPS signals due to the fact that, for example, the vehicle, with which the GPS receiver is equipped, goes through a tunnel. Hereafter, this state is referred to as "on-GPS-measurement-state".

At time t0, it becomes possible to receive a plurality of GPS signals (i.e., to use a plurality of GPS satellites) required for performing the GPS measurement, and the GPS receiver obtains navigation data, such as ephemeris. The GPS receiver starts to perform the GPS measurement at t0. Hereafter, this state in which the GPS signals can be received is referred to as "GPS-measurement-state".

That is, FIG. 1 shows progression of 2DRMS and the real error 61 of the GPS solution over time, after the GPS receiver goes into the GPS-measurement-state from the non-GPS-measurement-state.

At time t0, since the Kalman filter does not have historical data (past GPS solutions), the real error included in the GPS solution outputted by the GPS receiver (i.e., the estimate of the Kalman filter) becomes relatively large as shown in FIG. 1. Then, the Kalman filter converges the estimate to a real location of the vehicle with the passage of time. As the estimate converges, accuracy of the estimate increases. Accordingly, the real error 61 included in the estimate decreases.

The 2DRMS can take a low value at time to when the GPS-measurement-state starts because the 2DRMS is a variable which depends on only an instantaneous GPS satellites geometry. The real error 61 falls under the 2DRMS at time t1.

Considering that the navigation system makes the selection described above (i.e., the navigation system selects the GPS solution or DR solution by comparing the evaluation value of DR solution with the 2DRMS) during a time period t0–t1, where the 2DRMS is smaller than the real error 61 (i.e., the 2DRMS does not reflect the real error 61 during the time period t0–t1). In this case, even though real accuracy of the DR solution is higher than real accuracy of the GPS solution, the GPS solution may be selected as a location of the vehicle because the 2DRMS is smaller than the evaluation value of the DR solution.

Such wrong selection causes an accidental jump of a location of a vehicle shown on a map displayed on a monitor screen of the navigation system.

A GPS receiver or a navigation system capable of providing an accurate evaluation value which reflects a real error included in the GPS solution under all condition is required.

SUMMARY OF THE INVENTION

It is therefore an object of the invention to provide a GPS receiver or a navigation system capable of calculating an accurate evaluation value which properly reflects a real error included in the GPS solution. A further object of the invention is to provide an improved calculation method for obtaining the accurate evaluation value which properly reflects a real error included in the GPS solution.

For the above object, according to the invention, there is provided a GPS receiver which is provided with a GPS measurement system which performs GPS measurement to obtain a GPS solution, a computing system which provides evaluation values for evaluating errors included in the GPS solution obtained by the GPS measurement, and a modifying system that modifies the evaluation values. The modifying system treats the GPS solution as a dynamic system and modifies the evaluation values in accordance with a system state of the GPS solution in the past. Since the evaluation value is modified according to the past system state of the GPS solution, the past system state can be reflected into the evaluation value. Accordingly, a real error included in the GPS solution can be reflected into the evaluation value under all conditions.

According to another aspect of the invention, there is provided a GPS receiver which is provided with a GPS measurement system which performs GPS measurement to obtain a GPS solution using a Kalman filter, and a computing system which calculates 2DRMS, which is an evaluation value for evaluating an error included in the GPS solution obtained by the GPS measurement, according to an equation:

$$2DRMS = 2 \times \sqrt{(\sigma_{H+di\_Kalman})^2 + (HDOP \times \sigma_{UERE})^2}$$

wherein, $\sigma H\_Kalman$ represents a horizontal component of an estimate error obtained from a diagonal in an error covariance matrix calculated in a mathematical process of the Kalman filter, HDOP represents a horizontal dilution of precision, and $\sigma_{UERE}$ represents an user equivalent range error. Since the 2DRMS is a root sum square value of $\sigma H\_Kalman$ and $HDOP^*\sigma_{UERE}$, a value of $\sigma H\_Kalman$ can be reflected into the 2DRMS. Further, since the $\sigma H\_Kalman$ reflects a past system state of the GPS solution, the past system state can be reflected into the 2DRMS. Accordingly, a real error included in the GPS solution can be reflected into the 2DRMS under all conditions.

According to another aspect of the invention, there is provided a GPS receiver which is provided with an integrating system which performs an integrated positioning, which is an integrated procedure of GPS measurement and dead-reckoning positioning, to obtain an integrated solution using the Kalman filter, and a computing system which calculates 2DRMS, which is an evaluation value for evaluating an error included in the integrated solution obtained by the integrated positioning, according to a first equation:

$$2DRMS = 2 \times \sqrt{(\sigma_{H+di\_Kalman})^2 + (HDOP \times \sigma_{UERE})^2}$$

wherein, $\sigma H\_Kalman$ represents a horizontal component of an estimate error obtained from a diagonal in an error covariance matrix calculated in a mathematical process of the Kalman filter, HDOP represents a horizontal dilution of precision, and $\sigma_{UERE}$ represents an user equivalent range error. Since the 2DRMS is a root sum square value of $\sigma H\_Kalman$ and $HDOP^*\sigma_{UERE}$, a value of $\sigma H\_Kalman$ can be reflected into the 2DRMS. Further, since the $\sigma H\_Kalman$ reflects a past system state of the integrated solution, the past system state can be reflected into the 2DRMS. Accordingly, a real error included in the integrated solution can be reflected into the 2DRMS under all conditions.

Preferably, the computing system may calculate 2DRMS, when the GPS receiver is in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver being in the state.

Preferably, the integrating system calculates the integrated solutions based only on the dead-reckoning when the GPS receiver being in the state.

According to another aspect of the invention, there is provided a navigation system which is provided with a GPS measurement system which performs GPS measurement to obtain a GPS solution using a Kalman filter, and a computing system which calculates 2DRMS, which is an evaluation value for evaluating an error included in the GPS solution obtained by the GPS measurement, according to an equation:

$$2DRMS = 2 \times \sqrt{(\sigma_{H+di\_Kalman})^2 + (HDOP \times \sigma_{UERE})^2}$$

wherein, $\sigma H\_Kalman$ represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error. The navigation system further provided with a position estimating system which estimates positions based on the 2DRMS and the GPS solution obtained by the GPS measurement. Since the σH_Kalman reflects a past system state of the GPS solution, the past system state can be reflected into the 2DRMS. Accordingly, a real error included in the GPS solution can be reflected into the 2DRMS under all conditions. Accuracy of the positions estimated by the estimating system can be enhanced because the position estimating system estimates the positions using the 2DRMS and GPS solution.

According to another aspect of the invention, there is provided a navigation system which is provided with an integrating system which performs an integrated positioning, which is an integrated procedure of GPS measurement and dead-reckoning positioning, to obtain an integrated solution using the Kalman filter, and a computing system which calculates 2DRMS, which is an evaluation value for evaluating an error included in the integrated solution obtained by the integrated positioning, according to a first equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error. The navigation system further provided with a position estimating system which estimates positions based on the integrated solution and the 2DRMS calculated according to the first equation. Since the σH_Kalman reflects a past system state of the integrated solution, the past system state can be reflected into the 2DRMS. Accordingly, a real error included in the integrated solution can be reflected into the 2DRMS under all conditions. Accuracy of the positions estimated by the estimating system can be enhanced because the position stimating system estimates the positions based on the 2DRMS and the integrated solution.

Preferably, the computing system may calculate the 2DRMS, when the navigation system is in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver goes into the state. In this case, the position estimating system may use the 2DRMS calculated according to the second equation when the GPS receiver being in the state.

Preferably, the integrating system may calculate the integrated solution based only on the dead-reckoning when the navigation system being in the state.

According to another aspect of the invention, there is provided a method for calculating 2DRMS in a GPS receiver. The method includes calculating the 2DRMS according to a first equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error. Since the 2DRMS is a root sum square value of σH_Kalman and HDOP*$\sigma_{UERE}$, a value of σH_Kalman can be reflected into the 2DRMS. Further, since the σH_Kalman reflects a past system state of GPS solution obtained by GPS measurement in the GPS receiver, the past system state can be reflected into the 2DRMS. Accordingly, a real error included in the GPS solution can be reflected into the 2DRMS under all conditions.

Preferably, the calculating step includes calculating the 2DRMS, when the GPS receiver being in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver goes into the state.

DETAILED DESCRIPTION OF THE EMBODIMENTS

First Embodiment

Figure 2:
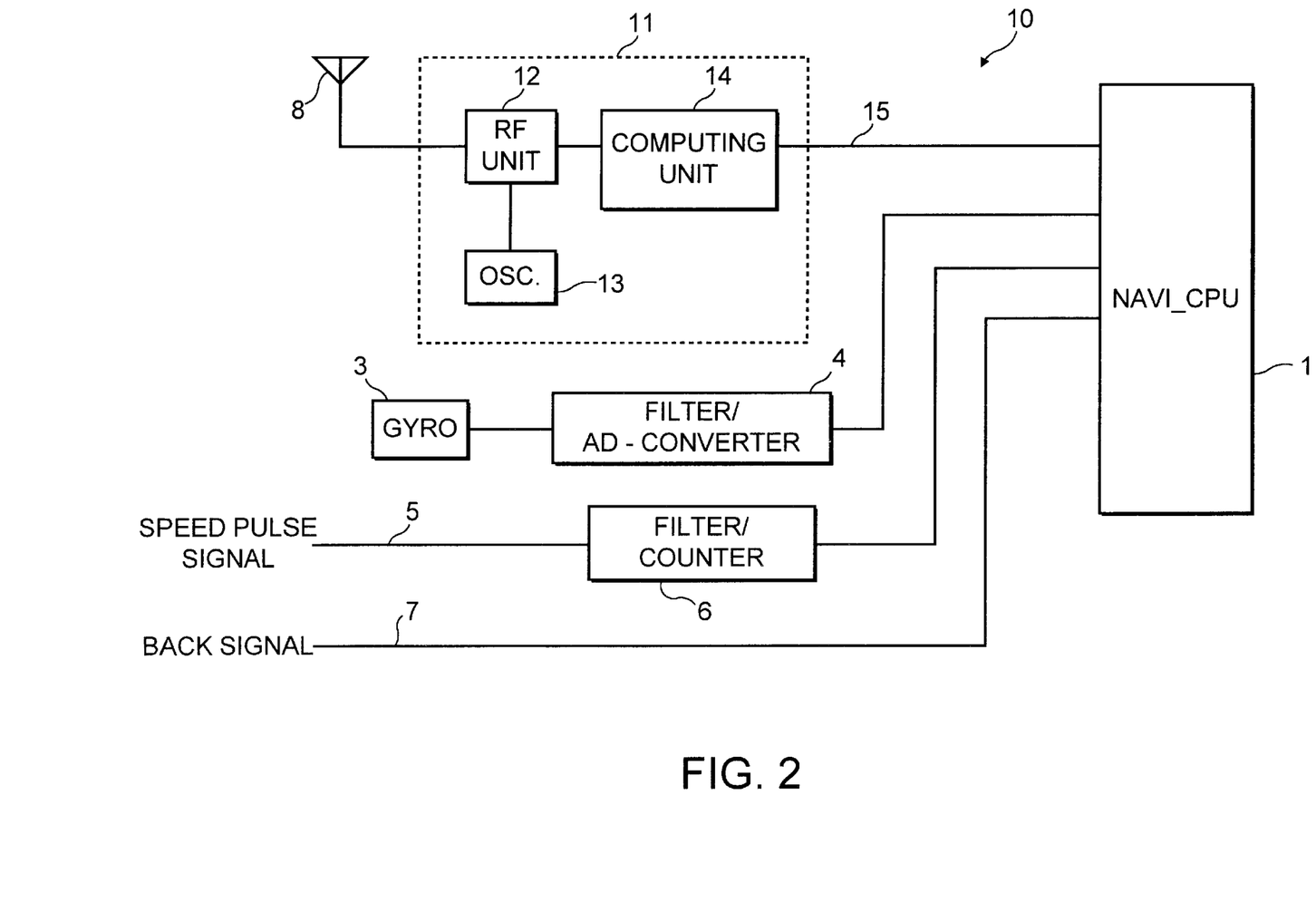
FIG. 2 shows a block diagram of a car navigation system, according to a first embodiment of the present invention.

FIG. 2 shows a block diagram of a car navigation system 10 according to a first embodiment of the present invention. It should be noted that only elements, which concern to GPS measurement and dead-reckoning, among all elements of the car navigation system 10, are shown in FIG. 2 for simplicity.

As shown in FIG. 2, the navigation system 10 is provided with a GPS receiver 11. The GPS receiver 11 is provided with RF (radio frequency) unit 12 which downconverts a GPS signal caught by an antenna 8 to a lower intermediate frequency by mixing a signal from a local oscillator 13 with the GPS signal. The RF unit 12 is connected to a computing unit 14 which performs the GPS measurement using the Kalman filter. The GPS receiver 15 is connected to a NAVI_CPU 1, which is a CPU (Central Processing Unit) on which a navigation application program is executed.

Figure 3:
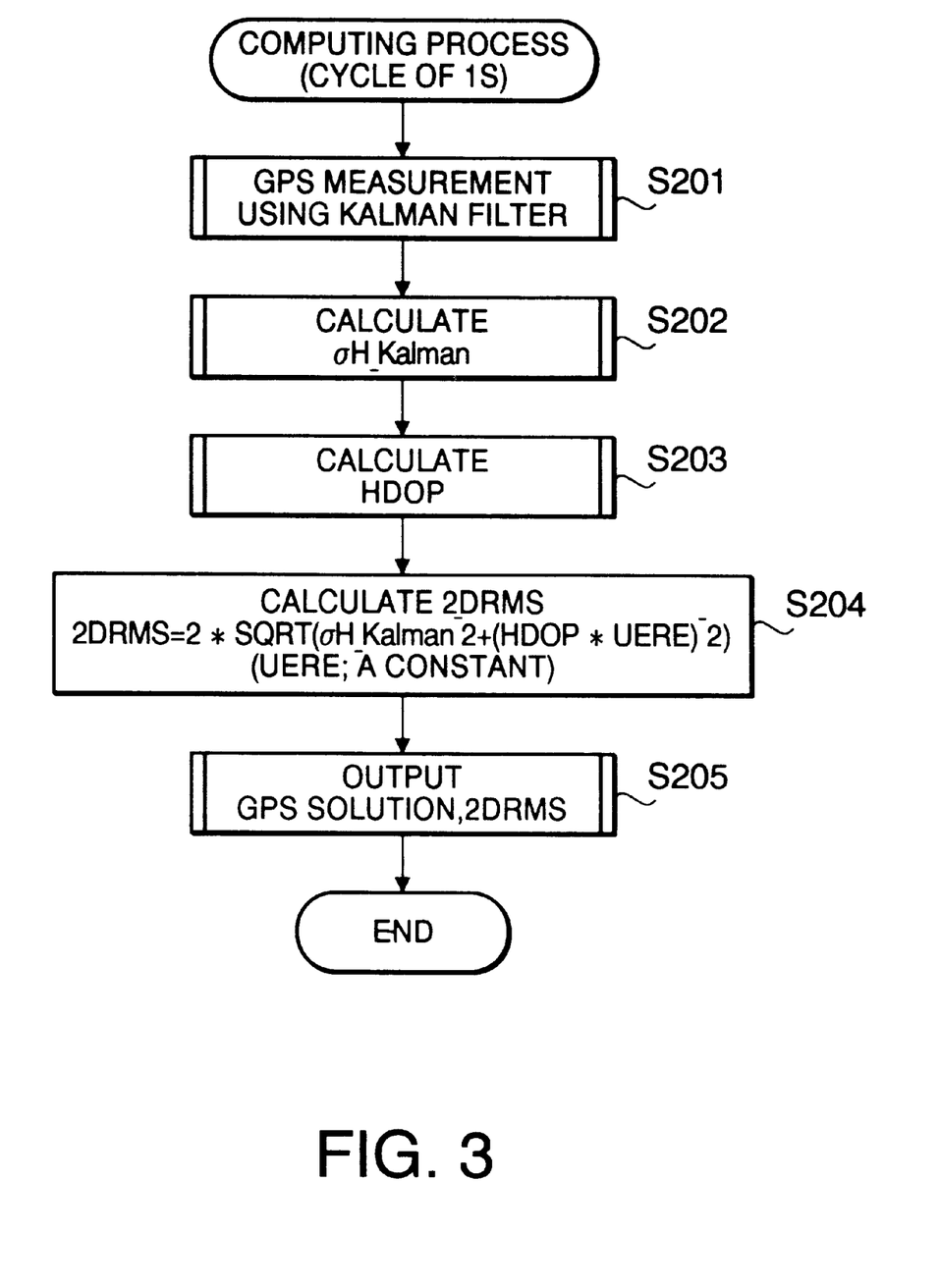
FIG. 3 shows a flowchart of a computing process in a GPS receiver, according to the first embodiment of the present invention.

FIG. 3 shows a flowchart of a computing process in the GPS receiver 11. The computing process in FIG. 3 is repeated, for example, in a cycle of 1 second.

Initially, the computing unit 14 performs the GPS measurement using the Kalman filter (S201). Next, the computing unit 14 calculates σH_Kalman (S202).

It is known to a person skilled in the art that σH_Kalman, a horizontal (a latitude-longitude direction) component of an error in the estimate of the Kalman filter, can be obtained from a diagonal in an error covariance matrix which is calculated in a mathematical process of the Kalman filter.

In step S203, based on geometry of GPS satellites used in the GPS measurement in step S201, HDOP is calculated.

In step S204, using σH_Kalman calculated in step S202, the HDOP calculated in S203 and $\sigma_{UERE}$, 2DRMS is calculated by the equation (3):

$$2DRMS = 2 \times \sqrt{(\sigma_{H+di-Kalman})^2 + (HDOP \times \sigma_{UERE})^2} \quad (3)$$

where $\sigma_{UERE}$ is a predetermined constant. The 2DRMS is a RSS (root-sum-square) value of the σH_Kalman and HDOP*$\sigma_{UERE}$.

Because of a nature of the mathematical process of the Kalman filter, the σH_Kalman reflects a past system state of the GPS solution which is treated as a dynamic system. Accordingly, the 2DRMS according to the equation (3) can reflect a past system state of the GPS solution with reflecting a parameter HDOP*$\sigma_{UERE}$.

In step S205, the GPS solution obtained in step S201 and the accurate 2DRMS obtained in step S204 are transferred from the GPS receiver 11 to the NAVI_CPU 1.

A gyro 3 outputs a DC voltage corresponding to an angular velocity in a direction of rotation of a vehicle in which the car navigation system 10 is equipped. A Filer/AD-converter 4 removes noise from the signal input from the gyro 3 and then the Filter/AD-converter 4 converts the signal from the gyro 3 into a digital signal. The digital signal output from the Filter/AD-converter 4 is input to the NAVI_CPU 1.

A speed pulse signal 5 transmitted from a velocity sensor (not shown) has a frequency corresponding to a velocity of the vehicle. A Filter/Counter 6 removes noise from the speed pulse signal 5 and then the Filter/Counter 6 counts the number of pulses of the speed pulse signal 5. The counted number obtained by the Filter/Counter 6 is input to the NAVI_CPU 1.

A back signal 7 indicates whether the vehicle is going ahead or backward. The back signal 7 is also input to the NAVI_CPU 1.

Figure 4:
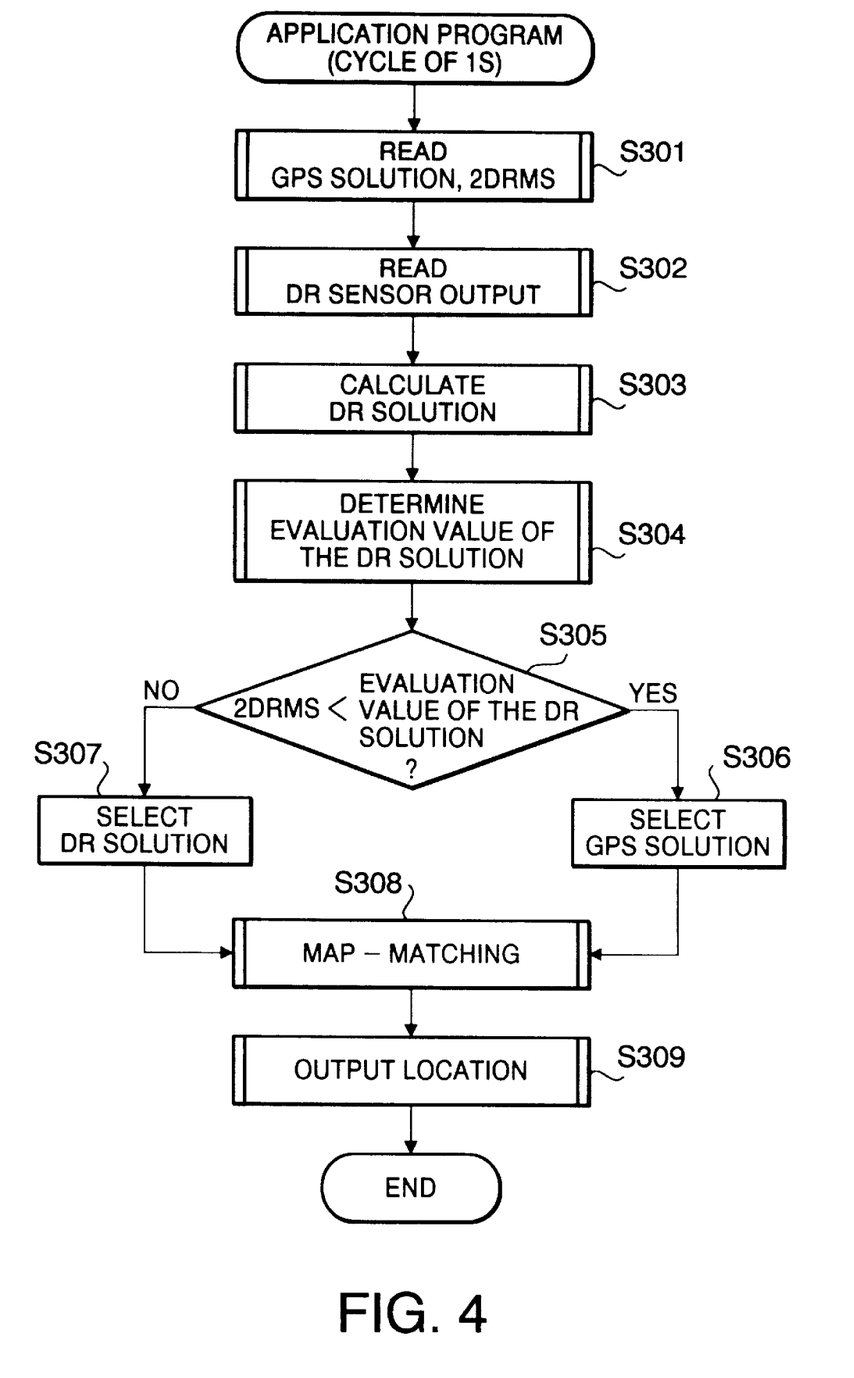
FIG. 4 shows a flowchart of a navigation application program executed by a CPU in a navigation system, according to the first embodiment of the present invention.

FIG. 4 shows a flowchart of the navigation application program executed by the NAVI_CPU 1. The process shown in FIG. 4 is repeated, for example, in a cycle of 1 second.

As shown in FIG. 4, initially, the GPS solution and the 2DRMS are transferred from the GPS receiver 11 to the NAVI_CPU 1 (S301). Then, dead-reckoning sensor signals (a signal from the gyro3, the speed pulse signal, and the back signal) are received (S302) and the DR solution is calculated (S303). Next, an evaluation value which indicates an error included in the DR solution is determined (S304).

In step S305, the NAVI_CPU 1 compares the evaluation value of the DR solution with the 2DRMS. If the 2DRMS is smaller than the evaluation value of the DR solution, i.e., the GPS solution is more accurate than the DR solution (S305: YES), the GPS solution is selected as a location of the vehicle (S306). If the evaluation value of the DR solution is smaller than or equal to the 2DRMS, i.e., the DR solution is more accurate than the GPS solution (S305: NO), the DR solution is selected as the location of the vehicle (S307).

In step S308, the location selected in step S306 or step S307 is compensated using a map-matching. In the map-matching, map data read from a map database (not shown) is used.

Therefore, the location of the vehicle (a final result of the process of the navigation application program) is obtained (S309).

It should be noted that, functions, for example, a route searching, required by a general car navigation system are also performed by the NAVI_CPU 1.

The NAVI_CPU 1 can use the 2DRMS according to the equation (3) in step S305. Accordingly, the NAVI_CPU 1 use more appropriate evaluation value, which exactly reflects a real error included in the GPS solution input from the GPS receiver 11, than the conventional evaluation value (i.e., the 2DRMS according to the equation (1)).

In this case, the comparison in step S305 performed appropriately. Therefore, accuracy of the final result obtained in step S309 is increased.

Figure 5:
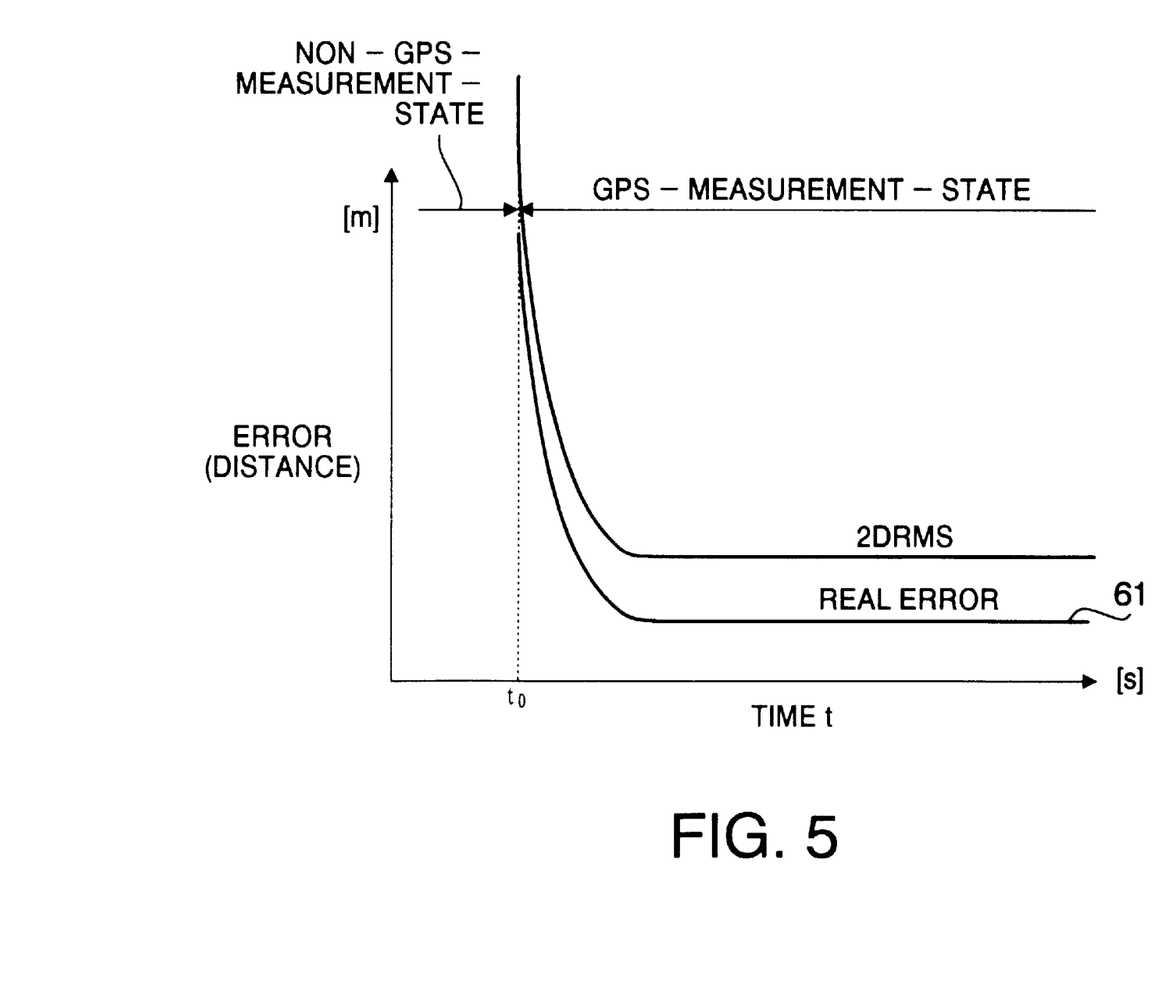
FIG. 5 shows progression of the 2DRMS and a real error in the GPS solutions over time, according to the first embodiment of the present invention.

FIG. 5 shows progression of the 2DRMS according to the equation (3) and a real error in the GPS solution over time. As in the case of FIG. 1, relatively long time period up to t0 represents a state in which the GPS receiver 11 can not receive GPS signals, and it becomes possible to receive a plurality of GPS signals (i.e., to use a plurality of GPS satellites) required for performing the GPS measurement. The GPS receiver 11 obtains the navigation data, such as ephemeris, and starts to perform the GPS measurement at time t0.

As shown in FIG. 5, the 2DRMS can take a high value at time t0 when the GPS measurement starts. This is based on the fact that a convergence condition of the estimate of the Kalman filter is deteriorated under circumstances where non-GPS-measurement-state has continued for a relatively long time period up to t0 and that the deteriorated convergence condition is reflected in the 2DRMS through the σH_Kalman.

Accordingly, while the 2DRMS takes a high value at t0 reflecting the real error in the GPS solution, the 2DRMS converges immediately to a low value with the passage of time in conjunction with convergence of the estimate of the Kalman filter. The 2DRMS does not take lower value than the real error 61, therefore the situation where the conventional 2DRMS takes a lower value than the real error 61 during the time period t0–t1 shown in FIG. 1 is not occurs. Accordingly, it is prevented that the NAVI_CPU 1 selects the GPS solution even though the accuracy of the DR solution is more accurate than the GPS solution.

Second Embodiment

Figure 6:
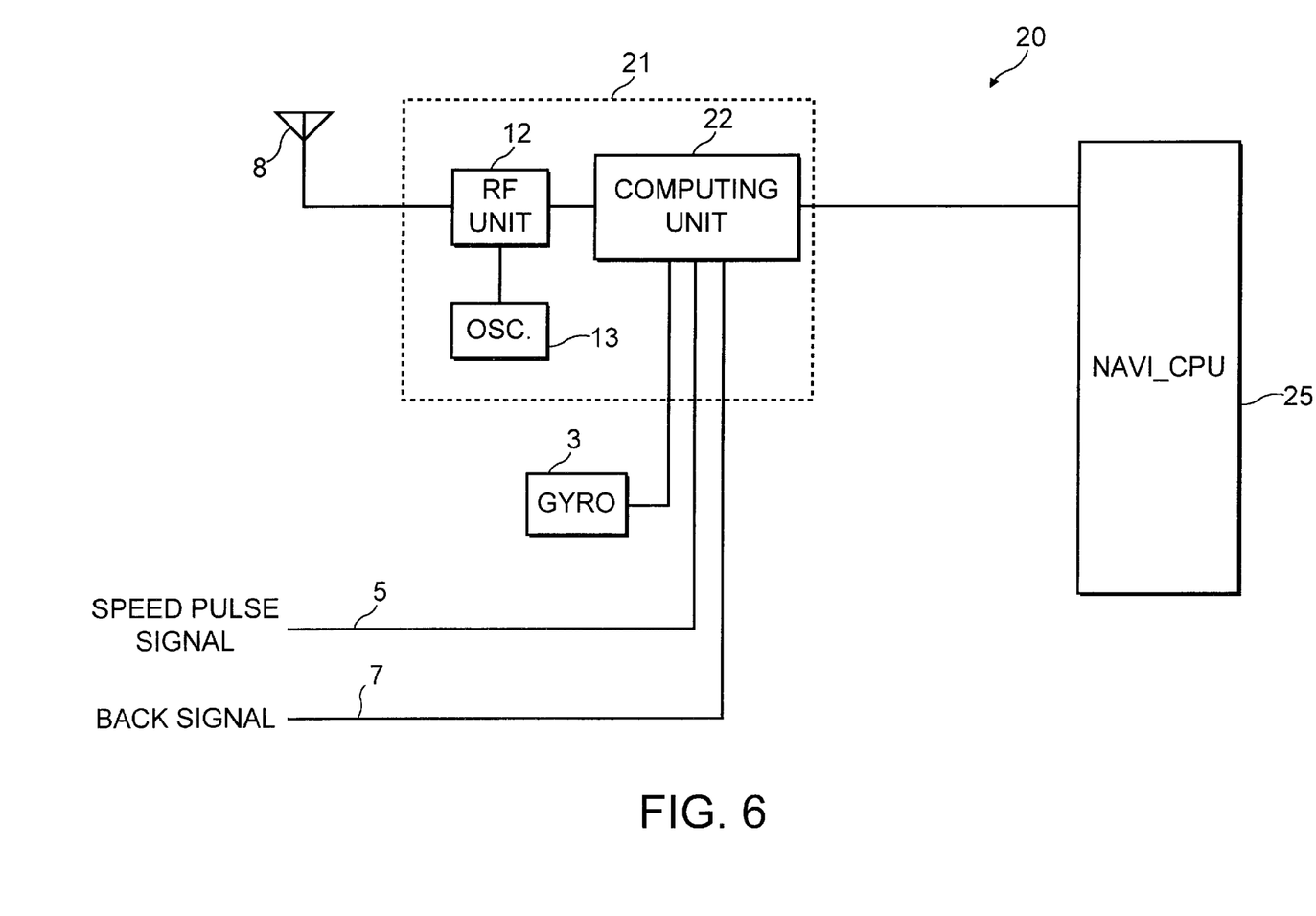
FIG. 6 shows a block diagram of a car navigation system, according to a second embodiment of the present invention.

FIG. 6 shows a block diagram of a car navigation system 20 according to the second embodiment of the present invention. In FIG. 6, elements having the same function as elements shown in FIG. 2 have the same reference numbers as the elements in FIG. 2. It should be noted that the output of the gyro 3, the speed pulse signal 5 and the back signal 7 are input to a GPS receiver 21.

In the GPS receiver 21, the computing unit 22 performs an integrated positioning, which is an integrated procedure of the GPS measurement and the DR positioning. The publication, "Understanding GPS: principles and applications", describes the integrated positioning, teachings of which are incorporated herein by reference. In one example of the integrated positioning, a velocity and an angular velocity, which are obtained by the DR positioning, are inputted to the Kalman filter, and an integrated solution is calculated.

The integrated solution is transmitted to a NAVI_CPU 25, which is a CPU on which a navigation application program is executed, from the computing unit 22.

The computing unit 22 calculates the integrated solution by performing the integrated positioning when the GPS measurement can be performed, while the computing unit 22 computes the solution by performing the DR positioning when the GPS measurement cannot be performed due to the fact that, for example, the vehicle, with which the car navigation system 20 is equipped, goes through a tunnel or goes into the immediate area of a building.

Hereafter, a state where both the GPS measurement and the DR positioning can be performed is referred to as "(DR+GPS) state", and a state where only the DR positioning can be performed is referred to as "(DR only) stated".

In the (DR+GPS) state positioning state, the computing unit 22 computes σH_Kalman and HDOP, and outputs the integrated solution and the 2DRMS. It should be noted that the σH_Kalman computed by the computing unit 22 indicates a horizontal error included in the integrated solution which reflects both the GPS solution and the DR solution.

In the (DR only) state, the GPS receiver 21 cannot receive the GPS signal, thereby the computing unit 22 cannot calculates HDOP. In this case, using "Last_HDOP" which is the latest HDOP before the GPS receiver 21 goes into (DR only) state, the computing unit 22 computes the 2DRMS according the equation (4):

$$2DRMS = 2 \times \sqrt{(\sigma_{H+di-Kalman})^2 + (LastHDOP \times \sigma_{UERE})^2} \quad (4)$$

Figure 7A:
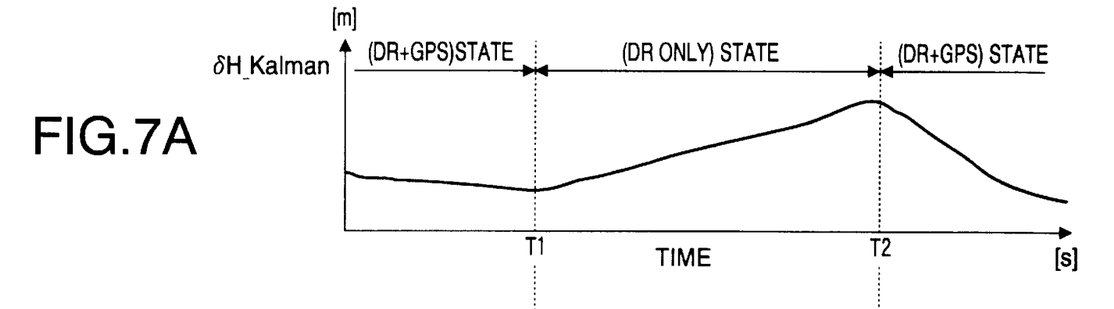
FIG. 7A shows progression of σH_Kalman calculated by a GPS receiver, according to the second embodiment of the invention.
Figure 7B:
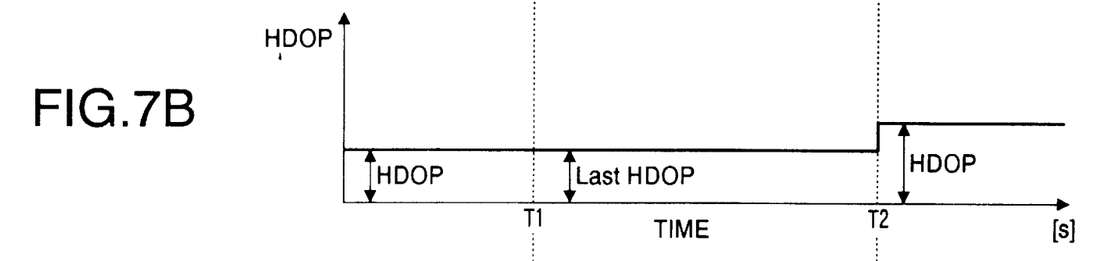
FIG. 7B shows progression of the HDOP used for calculating 2DRMS, according to the second embodiment of the invention.
Figure 7C:
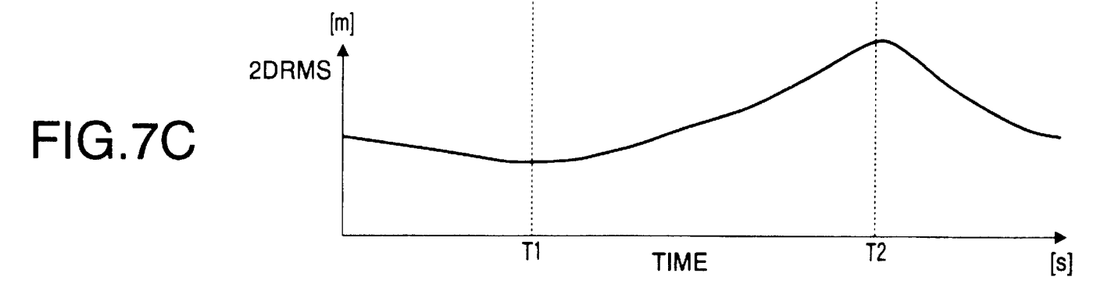
FIG. 7C shows progression of 2DRMS calculated by the GPS receiver, according to the second embodiment of the invention.

FIG. 7A–C shows progression of σH_Kalman (FIG. 7A), HDOP (FIG. 7B), and the 2DRMS (FIG. 7C) defined by the equation (4) in a case where the GPS receiver 21 goes into the (DR only) state from the (DR+GPS) state at T1, and goes into (DR+GPS) state again at T2.

As shown in FIG. 7A, σH_Kalman decreases with the passage of time during the time period up to T1. The 2DRMS also decreases with the passage of time during the time period up to T1 within which σH_Kalman decreases (FIG. 7C).

In the (DR only) state during the time period T1–T2, an error included in the DR solution (i.e., an error in output signal of the dead-reckoning sensor) is accumulated in the estimate of the Kalme filter because the GPS solution cannot be obtained and therefore the DR solution cannot be calibrated. Accordingly, the 2DRMS increases gradually as shown in FIG. 7C. In the (DR only) state, the HDOP at time T1 (i.e., the LastHDOP) is used for calculating the 2DRMS described above as shown in FIG. 7B.

The GPS receiver 21 goes into the (DR+GPS) state at time T2. After the GPS receiver 21 goes into (DR+GPS) state at time T2, the σH_Kalman decreases gradually because the GPS measurement starts again (FIG. 7A). Also, the 2DRMS decreases gradually as σH_Kalman decreases (FIG. 7C).

Figure 8:
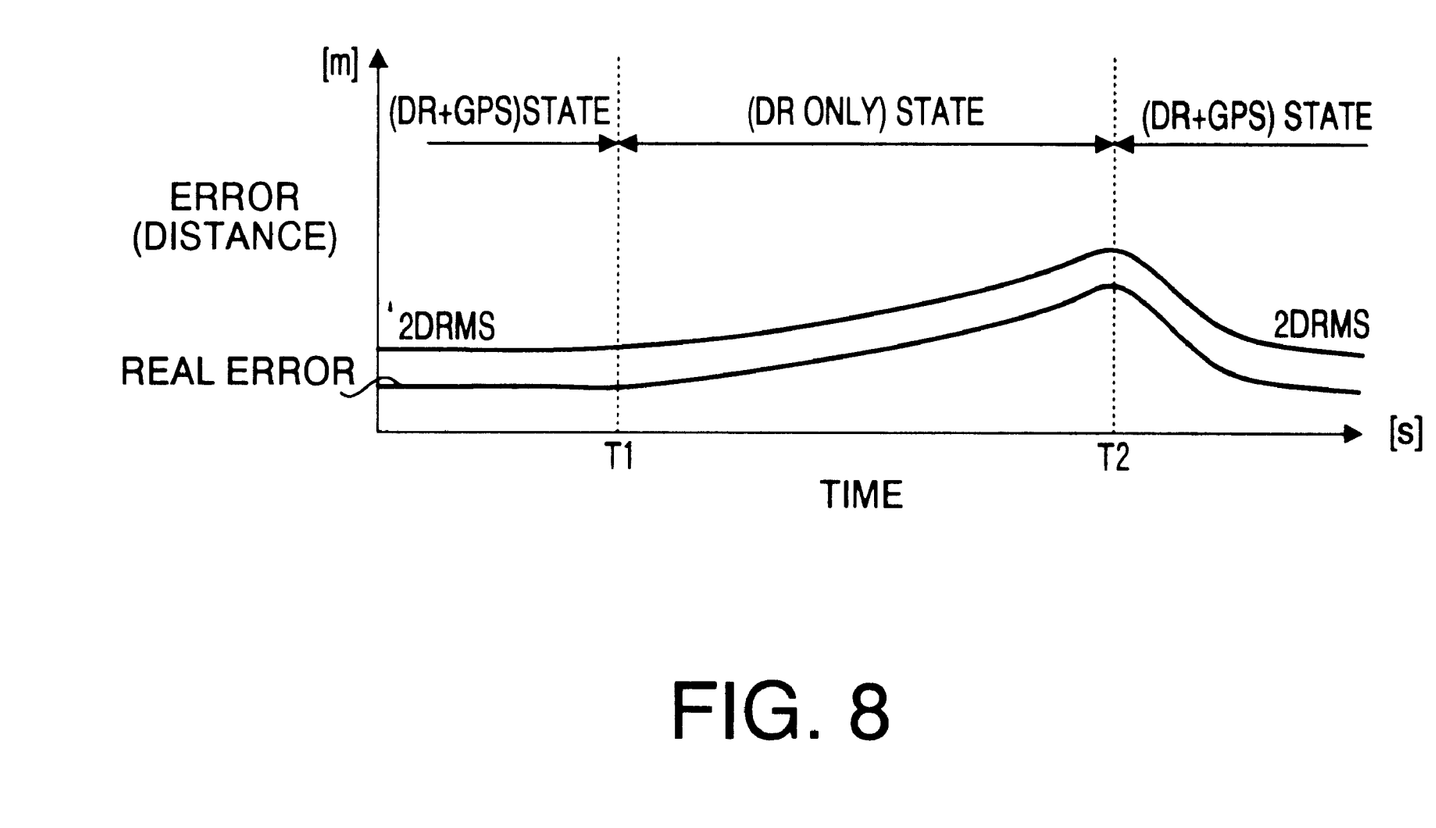
FIG. 8 is a graph conceptually showing a relationship between the 2DRMS and a real error in integrated solutions, according to the second embodiment of the invention.

FIG. 8 is a graph conceptually showing a relationship between the 2DRMS and the real error in the integrated solution. As in the case of FIG. 7A–C, within a time period up to T1, the GPS receiver 21 operates in the (DR+GPS) state, within a time period T1–T2, the GPS receiver 21 operates in the (DR only) state, and within a time period from T2, the GPS receiver 21 operates in the (DR+GPS) state.

As shown in FIG. 8, the 2DRMS reflects the real error in the integrated solution both in the (DR+GPS) state and in the (DR only) state.

Figure 9:
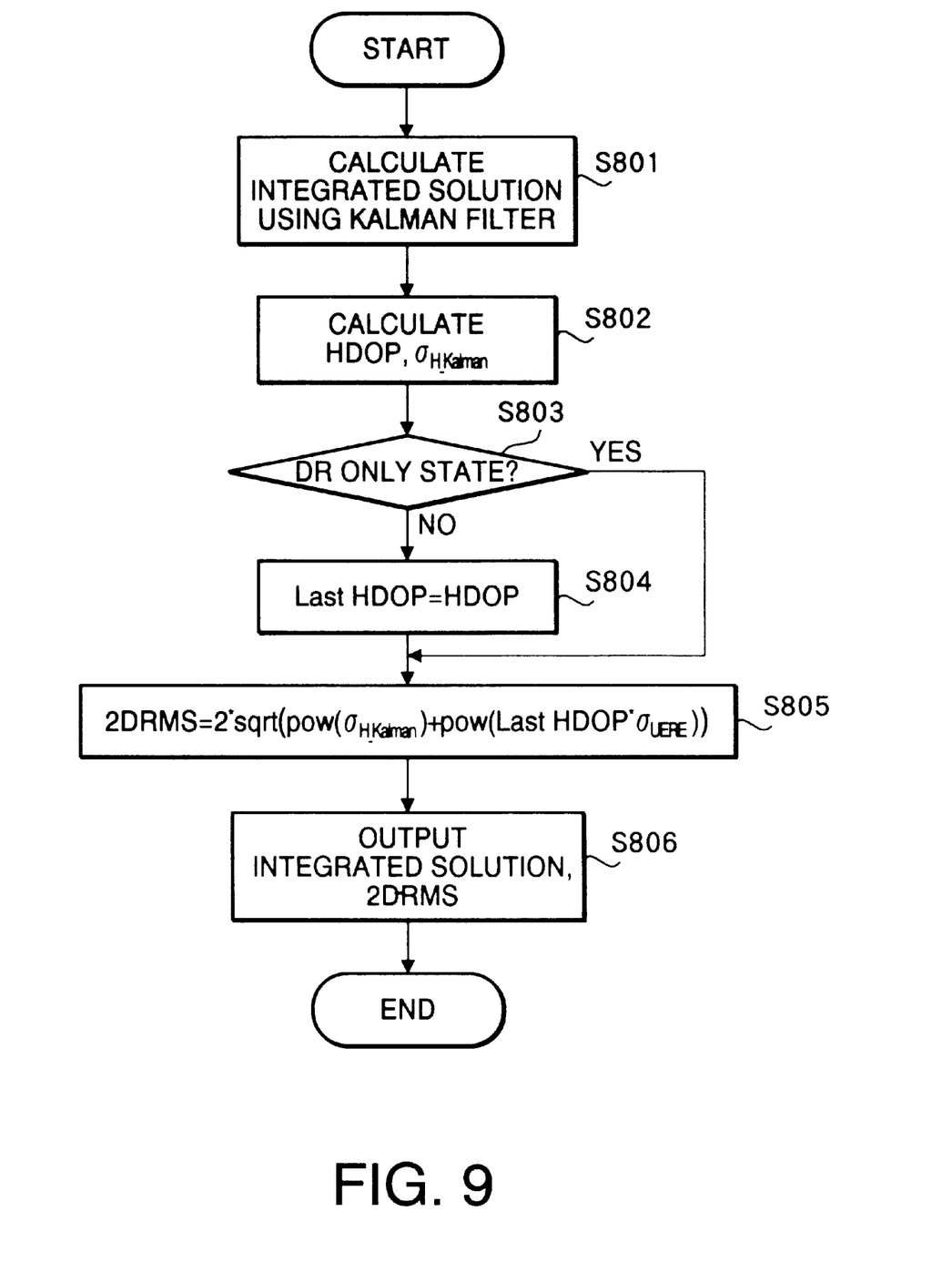
FIG. 9 shows a flowchart of a computing process performed by a computing unit in the GPS receiver, according to the second embodiment of the invention.

FIG. 9 shows a flowchart of a computing process performed by the computing unit 22 in the GPS receiver 21. The computing process shown in FIG. 9 is repeated, for example, in a cycle of 1 second.

Initially, the computing unit 22 calculates the integrated solution using the Kalman filter (S801). In step S802, the computing unit 22 calculates σH_Kalman from a diagonal in the error covariance matrix calculated in the mathematical process of the Kalman filter. The HDOP is also determined based on geometry of GPS satellites used for the GPS measurement in step S801.

In step S803, the computing unit 22 determines whether the GPS receiver 21 is in the (DR+GPS) state or in the (DR only) state by determining the GPS signal can be received or not. If the GPS receiver 21 is in the (DR only) state (S803: YES), then the 2DRMS is calculated according to the equation (4) in step S805.

If it is determined that the GPS receiver 21 is in the (DR+GPS) state (S803: NO), the process proceeds to step S804. In step S804, the computing unit 22 assigns a value of HDOP, calculated in step S802, to LastHDOP. In step S805, the 2DRMS is calculated according to the equation (4).

In step S806, the 2DRMS calculated at step S805 and the integrated solution calculated at step S801 are outputted from the computing unit 22. The 2DRMS and the integrated solution from the computing unit 22 are input to the NAVI_CPU 25.

In the car navigation system 20, a navigation application program, which estimates a location of a vehicle equipped with the car navigation system 20, is executed by the NAVI_CPU 25. Functions, for example, a route searching, required by a general car navigation system are also performed by the NAVI_CPU 25.

The navigation application program estimates a location of the vehicle by using the integrated solutions, the 2DRMS and a result of map-matching. By compensating the integrated solution using map data read from a map database (not shown in FIG. 6), the result of the map-matching is obtained.

Next, an example for estimating a location of the vehicle performed by the navigation application program in the navigation system 20 will be described.

Assuming that the vehicle equipped with the car navigation system 20 approaches bifurcation which bifurcates into rout-A and rout-B, and that the vehicle travels along a route-A. Further, assuming that a result of map-matching indicates that the vehicle is on the route-B. Since the integrated solution indicates a position near the route-A, the position indicated by the integrated solution goes away from the route-B with the passage of time.

In this case, the computing unit 22 uses the 2DRMS as an evaluation value for determining whether the computing unit 22 should select the integrated solution or the result of map-matching. The computing unit 22 selects the result of map-matching when a difference between the integrated solution and the result of map-matching is smaller than the 2DRMS. The computing unit 22 selects the integrated solution when a difference between the integrated solution and the result of map-matching lager than the 2DRMS.

It is should be understood that the 2DRMS defined by the equation (3) and the equation (4) appropriately reflects the real error included in the integrated solution because the 2DRMS is RSS value of the σH_Kalman and HDOP*$\sigma_{UERE}$. For example, even if the HDOP is deteriorated significantly due to geometry of the GPS satellites, an effect of the deteriorated HDOP to the 2DRMS is relatively small. Therefore, the wrong result of map-matching (i.e., the position on the route-B) is not selected. That is, an error of the map-matching is corrected immediately and reliably by using the 2DRMS. Accordingly, accuracy of the final result of the process of the navigation application program is increased.

The present disclosure relates to the subject matter contained in Japanese Patent Application No. 2000-084028, filed on Mar. 24, 2000, which is expressly incorporated herein by reference in its entirety.

What is claimed is:

1. A GPS receiver, comprising:

a GPS measurement system which performs GPS measurement to obtain a GPS solution using a Kalman filter; and a computing system which calculates 2DRMS, which is an evaluation value for evaluating an error included in the GPS solution obtained by the GPS measurement, according to an equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents an user equivalent range error.

2. The GPS receiver, comprising:

an integrating system which performs an integrated positioning, which is an integrated procedure of GPS measurement and dead-reckoning positioning, to obtain an integrated solution using the Kalman filter; and a computing system which calculates 2DRMS, which is an evaluation value for evaluating an error included in the integrated solution obtained by the integrated positioning, according to a first equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents an user equivalent range error.

3. The GPS receiver according to claim 2, wherein said computing system calculates 2DRMS, when the GPS receiver is in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver being in said state.

4. The GPS receiver according to claim 3, wherein said integrating system calculates said integrated solutions based only on the dead-reckoning when the GPS receiver being in said state.

5. A navigation system, comprising:

a GPS measurement system which performs GPS measurement to obtain a GPS solution using a Kalman filter;

a computing system which calculates 2DRMS, which is an evaluation value for evaluating an error included in the GPS solution obtained by the GPS measurement, according to an equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error; and a position estimating system which estimates positions based on said 2DRMS and the GPS solution obtained by the GPS measurement.

6. A navigation system, comprising:

an integrating system which performs an integrated positioning, which is an integrated procedure of GPS measurement and dead-reckoning positioning, to obtain an integrated solution using the Kalman filter;

a computing system which calculates 2DRMS, which is an evaluation value for evaluating an error included in the integrated solution obtained by the integrated positioning, according to a first equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error; and a position estimating system which estimates positions based on the integrated solution and said 2DRMS calculated according to said first equation.

7. The navigation system according to claim 6, wherein said computing system calculates the 2DRMS, when the navigation system is in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver goes into said state, and wherein said position estimating system uses the 2DRMS calculated according to said second equation when the GPS receiver being in said state.

8. The navigation system according to claim 7, wherein said integrating system calculates said integrated solution based only on the dead-reckoning when the navigation system being in said state.

9. A method for calculating 2DRMS in a GPS receiver, said GPS receiver using a Kalman filter, comprising:

calculating said 2DRMS according to a first equation:

$$2DRMS = 2 \times \sqrt{(\sigma_{H+di\_Kalman})^2 + (HDOP \times \sigma_{UERE})^2}$$

wherein, σH_Kalman represents a horizontal component of an estimate error obtained from a diagonal in an error covariance matrix calculated in a mathematical process of the Kalman filter, HDOP represents a horizontal dilution of precision, and $\sigma_{UERE}$ represents a user equivalent range error.

10. The method according to claim 9, wherein said calculating step includes calculating said 2DRMS, when the GPS receiver being in a state where GPS signals cannot be received, according to a second equation:

$$2DRMS = 2 \times \sqrt{(\sigma_{H+di\_Kalman})^2 + (LastHDOP \times \sigma_{UERE})^2}$$

wherein LastHDOP indicates HDOP calculated at a time before the GPS receiver goes into said state.

* * * * *